(12) United States Patent
Hawker et al.

(10) Patent No.: US 9,560,946 B2
(45) Date of Patent: Feb. 7, 2017

(54) MOTOR DRIVING APPARATUS

(75) Inventors: David John Hawker, Malmesbury (GB); George Francis Paul Oakham, Malmesbury (GB)

(73) Assignee: Dyson Technology Limited, Malmesbury, Wiltshire (GB)

(*) Notice: Subject to any disclaimer, the term of this patent is extended or adjusted under 35 U.S.C. 154(b) by 2187 days.

(21) Appl. No.: 12/441,878

(22) PCT Filed: Sep. 10, 2007

(86) PCT No.: PCT/GB2007/003379
§ 371 (c)(1),
(2), (4) Date: Oct. 19, 2009

(87) PCT Pub. No.: WO2008/035034
PCT Pub. Date: Mar. 27, 2008

(65) Prior Publication Data
US 2010/0045215 A1 Feb. 25, 2010

(30) Foreign Application Priority Data
Sep. 20, 2006 (GB) .................................. 0618490.7

(51) Int. Cl.
*H02P 1/00* (2006.01)
*A47L 9/10* (2006.01)
(Continued)

(52) U.S. Cl.
CPC .............. *A47L 9/2884* (2013.01); *A47L 5/24* (2013.01); *A47L 9/2842* (2013.01); *H02P 7/291* (2016.02)

(58) Field of Classification Search
CPC . A47L 9/2842; H01M 2/1022; H01M 2/1055; H01M 10/4207; B25F 5/00; H02P 7/29
(Continued)

(56) References Cited

U.S. PATENT DOCUMENTS 4,873,453 A 10/1989 Schmerda et al.
5,388,176 A 2/1995 Dykstra et al.
(Continued)

FOREIGN PATENT DOCUMENTS

GB 1 207 278 9/1970
JP 2001-353111 12/2001
(Continued)

OTHER PUBLICATIONS

GB search report dated Feb. 7, 2007 directed at counterpart application GB0618490.7; 1 page.
(Continued)

*Primary Examiner* — Eduardo Colon Santana
*Assistant Examiner* — Gabriel Agared
(74) *Attorney, Agent, or Firm* — Morrison & Foerster LLP

(57) ABSTRACT

A motor driving apparatus for a cleaning appliance includes a battery source and a power controller. The battery source supplies the power controller with an output having a first voltage which decreases as the battery source is discharged. The power controller modulates the output to produce a drive signal for driving a motor that has a second voltage and a variable duty cycle. The power controller increases the duty cycle of the drive signal as the first voltage decreases in order to maintain the second voltage at a substantially constant average value per unit time. By providing the above arrangement, the motor can be supplied with a constant voltage throughout the available run time of the battery. When forming part of a cleaning appliance having a motor, the above arrangement allows the motor to operate at a substantially constant speed throughout the run time of the battery.

7 Claims, 5 Drawing Sheets

(51) Int. Cl.
*A47L 9/02* (2006.01)
*H02P 7/29* (2016.01)
*A47L 9/28* (2006.01)
*A47L 5/24* (2006.01)

(58) Field of Classification Search
USPC ... 318/139, 499, 599; 15/347, 414; 388/811, 388/937
See application file for complete search history.

(56) References Cited

U.S. PATENT DOCUMENTS

| | | | |
|---|---|---|---|
| 6,066,834 A | 5/2000 | Rebold | |
| 6,188,187 B1 | 2/2001 | Harlan | |
| 6,239,508 B1* | 5/2001 | Faris et al. | 307/9.1 |
| 6,324,339 B1 | 11/2001 | Hudson et al. | |
| 6,664,748 B2* | 12/2003 | Kushida et al. | 318/139 |
| 7,133,601 B2* | 11/2006 | Phillips et al. | 388/804 |
| 2004/0045124 A1* | 3/2004 | Lindquist et al. | 15/347 |
| 2004/0100216 A1 | 5/2004 | Makaran et al. | |
| 2004/0179829 A1* | 9/2004 | Phillips et al. | 388/804 |
| 2004/0231096 A1* | 11/2004 | Battle et al. | 15/414 |
| 2008/0086833 A1* | 4/2008 | Capron-Tee | 15/331 |

FOREIGN PATENT DOCUMENTS

| | | |
|---|---|---|
| JP | 2002-282180 | 10/2002 |
| JP | 2002-360484 | 12/2002 |
| JP | 2003-310510 | 11/2003 |
| JP | 2004-129913 | 4/2004 |
| JP | 2005-168977 | 6/2005 |
| JP | 2006-95337 | 4/2006 |

OTHER PUBLICATIONS

International Search Report and Written Opinion, mailed Feb. 25, 2008, directed to counterpart International Patent Application No. PCT/GB2007/003379; 11 pages.

* cited by examiner

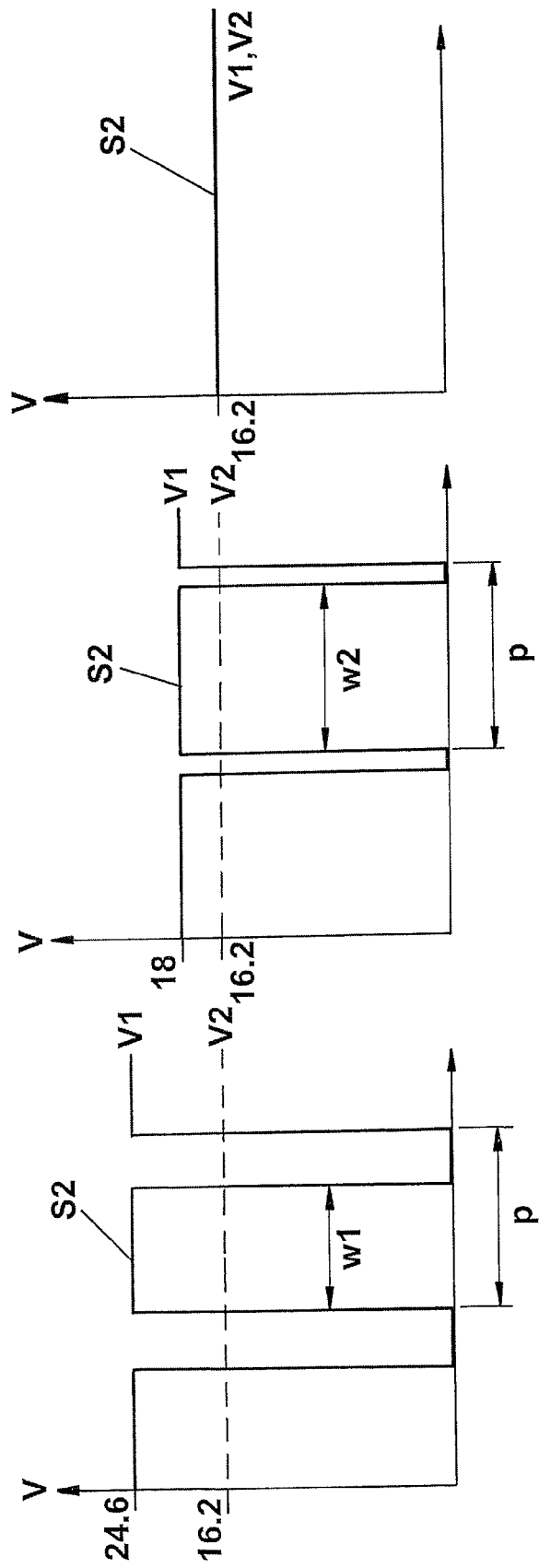

MOTOR DRIVING APPARATUS

REFERENCE TO RELATED APPLICATIONS

This application is a national stage application under 35 USC 371 of International Application No. PCT/GB2007/003379, filed Sep. 10, 2007, which claims the priority of United Kingdom Application No. 0618490.7, filed Sep. 20, 2006, the contents of which prior applications are incorporated herein by reference.

FIELD OF THE INVENTION

The invention relates to motor driving apparatus for a cleaning appliance. Particularly, but not exclusively, the invention relates to motor driving apparatus for a handheld vacuum cleaner.

BACKGROUND OF THE INVENTION

Handheld vacuum cleaners are well known and have been manufactured and sold for several years. Typically, a handheld vacuum cleaner comprises a body which houses a motor and a fan unit for generating an airflow. The airflow enters the vacuum cleaner via an inlet. A separator such as a filter, bag or cyclonic separator is located downstream of the inlet to separate dirt and dust from the airflow. An example of this type of vacuum cleaner is shown in GB 1 207 278.

It is common for a handheld vacuum cleaner to be battery powered. In many cases, a rechargeable battery is provided. However, a known disadvantage of battery powered vacuum cleaners is that the voltage supplied by the battery can drop significantly during use. Further, the rate at which the voltage drops increases as the charge remaining in the battery decreases. A reduction in battery voltage may result in a reduction in motor speed, leading to a reduced airflow through the vacuum cleaner and a corresponding reduction in the cleaning performance of the vacuum cleaner. This is inconvenient for a user because the vacuum cleaner will perform a less effective cleaning operation.

JP 2001-353111 discloses a rechargeable battery arrangement for driving a motor of a vacuum cleaner. The arrangement is able to compensate for a reduction in current supplied by the battery as the battery is drained in use. This is achieved by varying the duty of the current as the current from the battery reduces in order to supply a constant current to the motor.

SUMMARY OF THE INVENTION

It is an object of the invention to provide motor driving apparatus which enables a cleaning appliance to maintain good cleaning performance throughout the useable run time of the battery. A further object of the invention is to provide motor driving apparatus which is able to supply a substantially constant voltage from a battery source to a motor in order to maintain substantially constant the cleaning performance of a handheld vacuum cleaner during the useable run time of the battery.

The invention provides motor driving apparatus for a cleaning appliance comprising a battery source and a power controller, the battery source being adapted and arranged to supply the power controller with an output having a first voltage, the first voltage decreasing as the battery source is discharged, and the power controller being adapted and arranged to modulate the output to produce a drive signal for driving a motor, the drive signal having a second voltage and a variable duty cycle, wherein the power controller is adapted and arranged to increase the duty cycle of the drive signal as the first voltage decreases in order to maintain the second voltage at a substantially constant average value per unit time. By providing the above arrangement, the motor can be supplied with a substantially constant voltage throughout the useable run time of the battery. When driving a motor forming part of a cleaning appliance, the above arrangement allows the motor to operate at a substantially constant speed throughout the useable run time of the battery, resulting in more consistent cleaning performance.

Further, the maximum available voltage supplied by the battery is useable by the motor during an "on" period of the duty cycle and no power is drawn from the battery during the "off" period of the duty cycle. Therefore, a substantially constant voltage can be supplied to the motor without the need to dissipate excess voltage across, for example, a variable resistor when the battery voltage is higher than the desired voltage. This results in greater efficiency and improved battery life. In addition, the arrangement of the present invention is cheaper and simpler than alternative arrangements such as switched mode power supplies.

Preferably, the power controller is adapted and arranged to switch the motor off when the duty cycle reaches a pre-determined value. By providing such an arrangement, the power controller can determine whether the charge in the battery has reached the minimum value necessary to maintain the second voltage at a substantially constant average value per unit time. Operation beyond this point will result in the battery being unable to supply the voltage required to maintain the cleaning performance of the cleaning appliance. Therefore, it is desirable to switch the motor off at this point before the cleaning performance of the cleaning appliance is reduced. More preferably, the pre-determined value is 100%. When the duty cycle reaches 100%, power is being drawn continuously from the battery in order to maintain the required cleaning performance. Therefore, if the battery continues to be depleted the second voltage will drop below the minimum value necessary to maintain cleaning performance. Consequently, the power controller is arranged to switch the motor off before further charge is depleted from the battery and the cleaning performance is reduced.

Preferably, the battery source comprises at least one Lithium-ion cell. Lithium-ion cells have a high charge to weight ratio, making them ideal for hand held appliances.

Preferably, the first voltage is equal to the second voltage. By providing such an arrangement, there is no need to modify the amplitude of the voltage of the output from the battery when producing the drive signal to drive the motor. This eliminates the need for transformers or voltage regulators which may be bulky and inefficient.

BRIEF DESCRIPTION OF THE DRAWINGS

An embodiment of the invention will now be described with reference to the accompanying drawings, in which:

FIG. 3 shows a duty cycle of the drive signal at point A shown in FIG. 2;

FIG. 4 shows the duty cycle of the drive signal at point B shown in FIG. 2;

FIG. 5 shows the duty cycle of the drive signal at point C shown in FIG. 2;

DETAILED DESCRIPTION OF THE INVENTION

Figure 1:
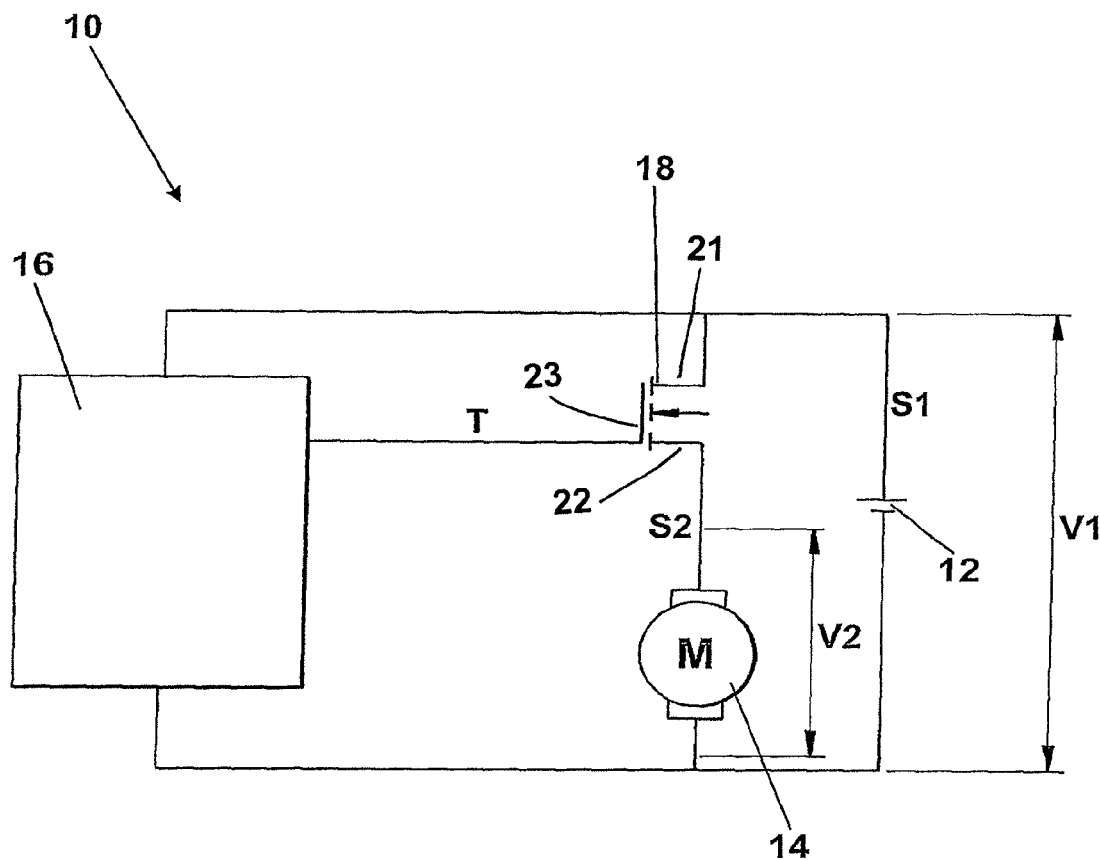
FIG. 1 is a simplified circuit diagram showing motor driving apparatus according to the invention.

FIG. 1 shows a motor driving apparatus 10 according to the invention. The motor driving apparatus 10 comprises a rechargeable battery 12, a motor 14 and a power controller 16. The motor driving apparatus 10 further comprises a power Metal Oxide Field Effect Transistor (power MOSFET) 18 which is located in parallel with the battery 12 and in series with the motor 14. The power MOSFET 18 has a source 22, a drain 21 and a gate 23 and functions as a switch between the positive and negative terminals of the battery 12.

The power controller 16 is connected to the gate of the power MOSFET 18. The gate can be switched in order to control the current flow between the source and the drain of the power MOSFET 18. The power controller 16 switches the gate using a timing signal T which has a frequency of 4 kHz and a duty cycle specified by the power controller 16. Under the control of the power controller 16, the timing signal T takes the form of a series of wave "packets" or pulses (on state), with a "dead time" (off state) in between. The dead time is determined by the duty cycle which is the ratio of the pulse width to the period.

The battery 12 comprises six Lithium-ion cells. Each Lithium-ion cell can generate a voltage of 4.1 V when fully charged. Six Lithium-ion cells produce a combined output S1 having a voltage V1 of 24.6 V when fully charged.

The motor 14 has a fan unit (not shown) for generating an airflow. The motor 14 and the fan unit require a voltage of 16.2 V in order to operate efficiently. Further constructional details of the motor 14 are not material to the invention and will not be discussed further. In this embodiment, the motor 14 is arranged to be driven by a drive signal S2. The drive signal S2 is generated by modulating the output S1 using the power MOSFET 18 controlled by the timing signal T. Therefore, the drive signal S2 has a frequency and a duty cycle which are the same as the frequency and the duty cycle of the timing signal T. The drive signal S2 has a maximum voltage equal to the voltage V1 of the output S1. However, because the drive signal S2 is modulated, the drive signal S2 also has an average voltage per unit time V2. In this embodiment, the average voltage per unit time V2 is equal to the minimum allowed voltage for driving the motor 14 which is 16.2 V.

Figure 2:
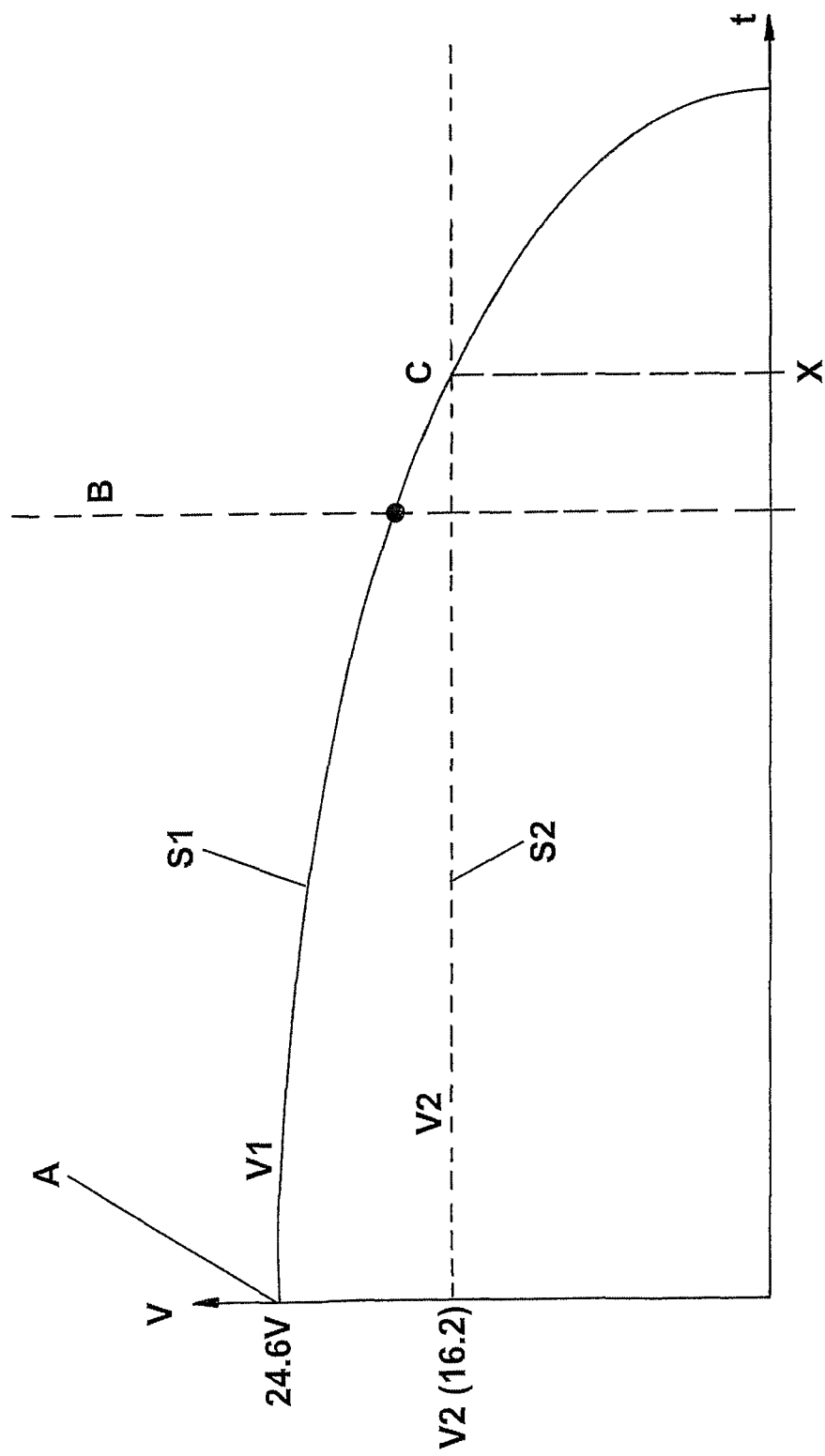
FIG. 2 is a graph of voltage against time for an output and a drive signal from the motor driving apparatus of FIG. 1.

In operation, the battery 12 produces the output S1 having a voltage V1 of 24.6 V when the battery 12 is fully charged. When a load is connected to the battery 12, current is drawn from the battery 12 and the charge stored therein will begin to be depleted. As the charge is depleted, the voltage V1 generated by the battery 12 will decrease. The time dependency of the voltage V1 for a constant load is shown in FIG. 2. As shown in FIG. 2, initially the voltage V1 drops slowly. However, when there is only a small amount of charge remaining in the battery 12, the voltage V1 drops more rapidly until the battery 12 is completely discharged. The average voltage per unit time V2 supplied to the motor 14 is also shown in FIG. 2. It can be seen that the average voltage per unit time V2 is constant until the motor 14 is switched off at time X. This will be described later. The amplitude of the average voltage per unit time V2 is determined by the duty cycle of the drive signal S2.

FIGS. 3 to 5 show the variation of duty cycle with the voltage V1 of the output S1. FIG. 3 shows the drive signal S2 at point A shown in FIG. 2. The drive signal S2 has a pulse width w1 and a period p. As can be seen from FIG. 3, the peak voltage of each pulse "packet" is equal to the voltage V1 of the output S1. At point A, the battery 12 is fully charged and the output S1 has the maximum voltage V1 of 24.6 V. In this case, the power controller 16 varies the duty cycle (where the duty cycle is equal to w1/p) of the drive signal S2 so that the average voltage per unit time V2 is equal to 16.2 V. This corresponds to a duty cycle of 65%. The required duty cycle can also be calculated from the ratio V2/V1.

FIG. 4 shows the duty cycle of the drive signal S2 at point B (FIG. 2). At this point, the drive signal S2 has a pulse width w2 and a duty cycle equal to w2/p. At point B, the voltage V1 of the output S1 has dropped to 18 V. Therefore, the peak voltage of the drive signal S2 is 18 V. Consequently, the required duty cycle is increased to 90% in order to maintain the average voltage per unit time V2 at the required value of 16.2 V.

FIG. 5 shows the duty cycle of the drive signal S2 at point C (FIG. 2). At point C, the voltage V1 of the output S1 has dropped to the minimum allowed value of 16.2 V. Therefore, the peak voltage of the drive signal S2 is 16.2 V and the required duty cycle is 100%. In this case, the power controller 16 detects that the duty cycle has reached the maximum value of 100% and switches the motor 14 off at time X (FIG. 2). This is because there is insufficient charge in the battery 12 to continue to maintain the average voltage per unit time V2 of the drive signal S2 at the required level of 16.2 V in order to keep the motor 14 operating at a substantially constant speed.

Figure 6:
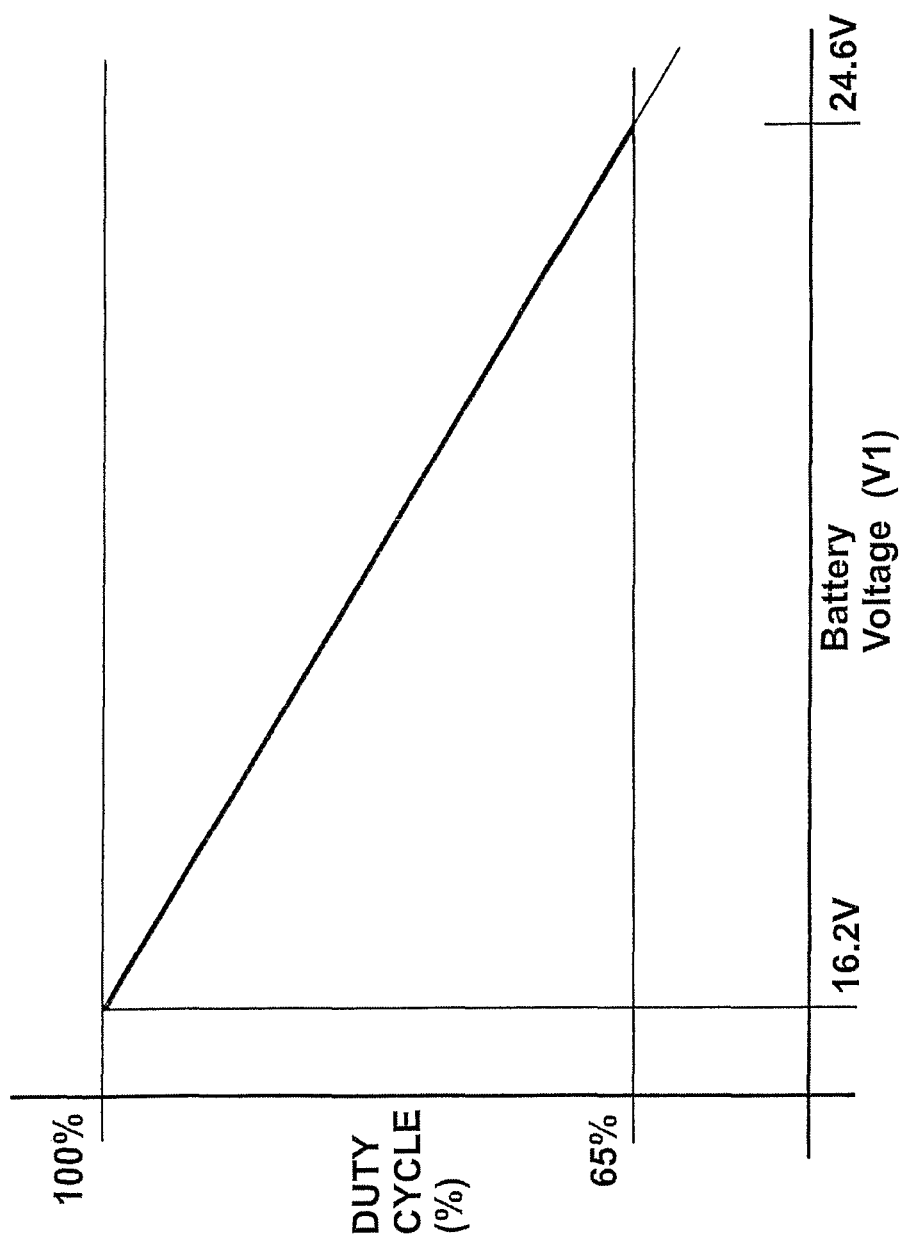
FIG. 6 shows a graph of the duty cycle of the drive signal plotted against the battery output voltage.

FIG. 6 shows the variation of duty cycle with the voltage V1 of the output S1 from the battery 14. It can be seen that the duty cycle is proportional to the voltage V1 and is continuously variable. By varying the duty cycle in this way, the average voltage per unit time V2 of the drive signal S2 supplied to the motor 14 can be maintained at the predetermined constant value of 16.2 V.

Figure 7:
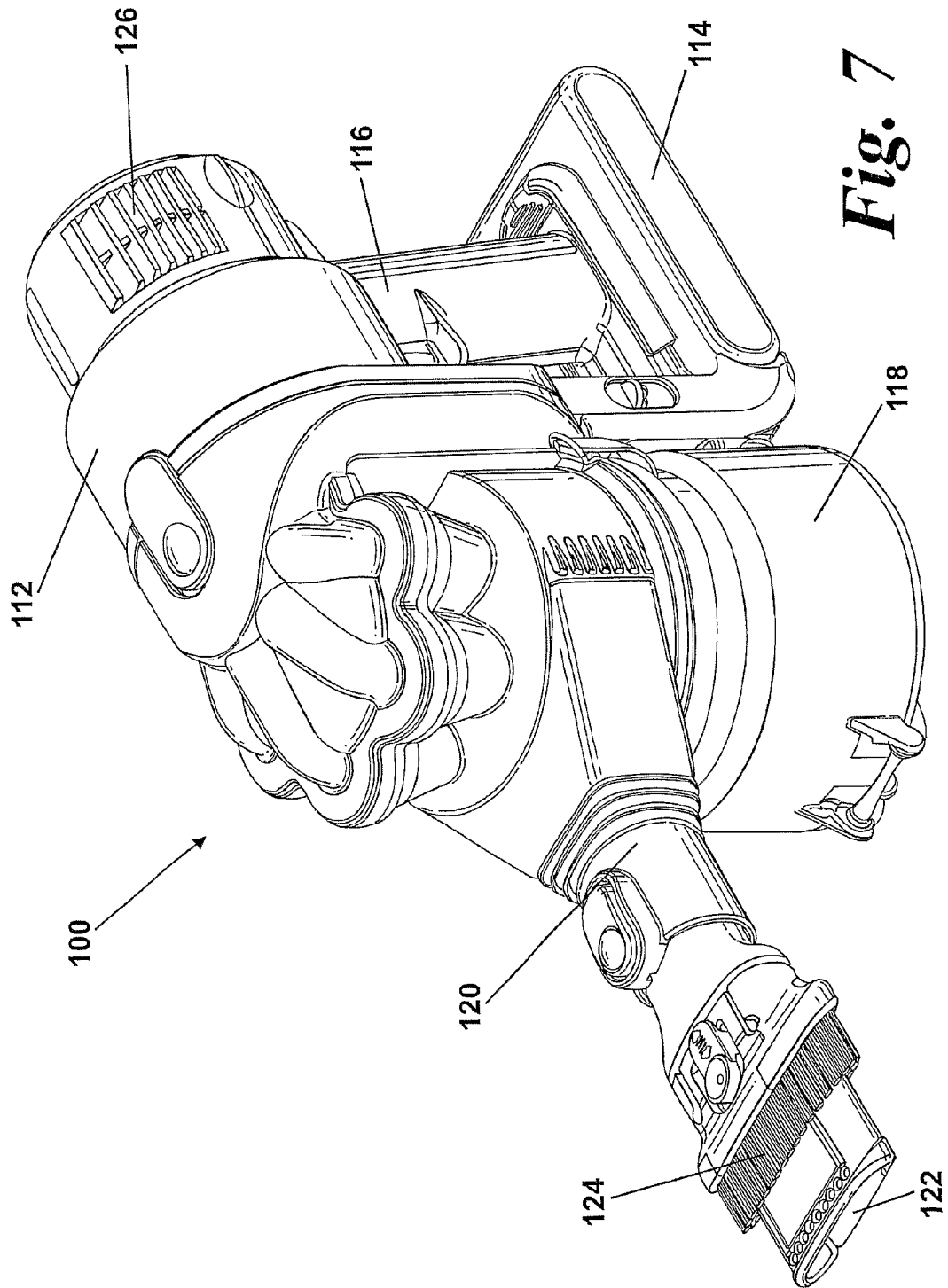
FIG. 7 is an isometric view of a handheld vacuum cleaner including the motor driving apparatus according to the invention.

FIG. 7 shows a handheld vacuum cleaner 100 including the motor driving apparatus 10 according to the invention. The hand-held vacuum cleaner 100 has a main body 112 which houses the motor 14 (not shown in FIG. 7) and fan unit (not shown) The main body 112 also includes a battery pack 114 including the battery 12. A handle 116 is provided on the main body 112 for manipulating the hand-held vacuum cleaner 100 in use. Cyclonic separating apparatus 118 is attached to the main body 112. An inlet pipe 120 extends from a portion of the cyclonic separating apparatus 118 remote from the main body 112. A dirty air inlet 122 is formed at the distal end of the inlet pipe 120. A brush tool 124 is slidably mounted on the distal end of the inlet pipe 120. A set of exhaust vents 126 are provided on the main body 112 for exhausting air from the hand-held vacuum cleaner 100.

In use, the motor and fan unit draws a flow of dirt- and dust-laden air into the dirty air inlet 122, through the inlet pipe 120 and into the cyclonic separating apparatus 118. The cyclonic separating apparatus 118 separates dirt and dust from the airflow. The cleaned airflow then passes through the motor 14 and out of the exhaust vents 126.

Cyclonic separators are less prone to becoming blocked with dirt and dust than a filter or bag separator. Therefore, the use of a cyclonic separator combined with the motor driving apparatus of the present invention results in a handheld cleaning appliance which is able to maintain good cleaning performance throughout the useable run time of the battery.

The invention is not limited to the precise details of the embodiment described above. For example, the motor need not form part of the motor driving apparatus and could be a separate component. Further, the drive signal need not be switched by a power MOSFET and other types of mechanical or electrical switches could be used.

Additionally, the drive signal need not have the same maximum amplitude as the output from the battery. Two batteries may be linked to give a larger drive signal, or a form of transformer could be used.

Additionally, the motor may be switched off at a duty cycle which is different from 100%. For example, the motor may be switched off at a lower duty cycle. Further, the switching off of the motor may be determined by other factors, for example, the output voltage from the battery, the average voltage per unit time of the drive signal, the temperature of the battery or the speed of rotation of the motor. These additional factors may be used instead of, or additional to, the duty cycle measurement.

The invention is applicable to all types of cleaning appliance, for example, upright and cylinder vacuum cleaners, floor polishers, floor sweepers and wet/dry machines. What is important is that the motor driving apparatus is adapted and arranged to drive a motor at a constant voltage as the voltage supplied by a battery decreases.

The invention claimed is:

1. A motor driving apparatus for a cleaning appliance comprising a battery source and a power controller, the battery source being configured and connected to supply the power controller with an output having a first voltage, the first voltage decreasing as the battery source is discharged, and the power controller being configured and connected to modulate the output to produce a drive signal for driving a motor, the drive signal having a second voltage and a variable duty cycle,
wherein the power controller is configured and connected to increase the duty cycle of the drive signal as the first voltage decreases in order to maintain the second voltage at a substantially constant average value per unit time, and
the power controller is configured and connected to switch the motor off when the duty cycle reaches a pre-determined value of 100%.

2. The motor driving apparatus of claim 1, wherein the battery source comprises at least one Lithium-ion cell.

3. The motor driving apparatus of claim 1, wherein the first voltage is equal to the second voltage.

4. The motor driving apparatus of claim 1, further comprising a motor having a fan.

5. A cleaning appliance comprising the motor driving apparatus of claim 1.

6. The cleaning appliance of claim 5, wherein the cleaning appliance includes a cyclonic separator.

7. The cleaning appliance of claim 5, wherein the cleaning appliance is a handheld vacuum cleaner.

* * * * *